US008572431B2

(12) United States Patent
Adler et al.

(10) Patent No.: US 8,572,431 B2
(45) Date of Patent: Oct. 29, 2013

(54) DISASTER RECOVERY FRAMEWORK

(75) Inventors: Robert S. Adler, New York, NY (US); Rodney N. Brown, Humble, TX (US); Philip J. Brandenberger, Montclair, NJ (US); Alexander Lazen, Stamford, CT (US); Michael Chung, New York, NY (US)

(73) Assignee: Barclays Capital Inc., New York, NY (US)

(*) Notice: Subject to any disclaimer, the term of this patent is extended or adjusted under 35 U.S.C. 154(b) by 393 days.

(21) Appl. No.: 11/063,492

(22) Filed: Feb. 23, 2005

(65) Prior Publication Data

US 2006/0190766 A1    Aug. 24, 2006

(51) Int. Cl.
*G06F 11/00* (2006.01)

(52) U.S. Cl.
USPC .............................................. 714/13

(58) Field of Classification Search
USPC ........................................ 714/1–56
See application file for complete search history.

(56) References Cited

U.S. PATENT DOCUMENTS

| | | | |
|---|---|---|---|
| 5,938,732 A | 8/1999 | Lim et al. | |
| 5,951,695 A | 9/1999 | Kolovson | |
| 6,144,999 A | 11/2000 | Khalidi et al. | |
| 6,622,261 B1 | 9/2003 | Laranjeira et al. | |
| 7,260,737 B1* | 8/2007 | Lent et al. ................. | 714/5 |
| 2002/0004824 A1* | 1/2002 | Cuan et al. ................. | 709/208 |
| 2002/0138389 A1* | 9/2002 | Martone et al. ............. | 705/36 |
| 2003/0167343 A1* | 9/2003 | Furuno ....................... | 709/244 |
| 2005/0215128 A1* | 9/2005 | Levy et al. ................. | 439/894 |
| 2005/0268145 A1* | 12/2005 | Hufferd et al. ............. | 714/2 |
| 2006/0005189 A1* | 1/2006 | Vega et al. ................. | 718/1 |
| 2006/0090097 A1* | 4/2006 | Ngan et al. ................ | 714/6 |
| 2006/0117212 A1* | 6/2006 | Meyer et al. .............. | 714/4 |

FOREIGN PATENT DOCUMENTS

| | | |
|---|---|---|
| JP | 200099359 | 4/2000 |
| JP | 2002247619 | 8/2002 |
| JP | 200432103 | 1/2004 |

OTHER PUBLICATIONS http://www.performancedns.com/solutions.html, Dec. 29, 2004, PerformanceDNS.*
JP Second Office Action dated Jun. 7, 2011 for Japanese Application No. 2007557046, 6 pages.
JP First Office Action dated Mar. 16, 2010 for Japanese Application No. 2007557046, 3 pages.
Decision of Rejection dated Aug. 10, 2010 in Japanese Patent Application No. 2007-557046, 1 page.
Written Opinion of PCT/US2006/004806 dated Jun. 25, 2008, 4 pages.
International Search Report of PCT/US2006/004806 dated Jun. 25, 2008, 1 page.
International Preliminary Report on Patentability of PCT/US2006/004806 dated Mar. 10, 2009, 2 pages.

* cited by examiner

*Primary Examiner* — Scott Baderman
*Assistant Examiner* — Jigar Patel
(74) *Attorney, Agent, or Firm* — Morgan Lewis Bockius LLP

(57) ABSTRACT

A system and method of orchestrating failover operations of servers providing services to an internal computer network includes a DR server configured to execute a control script that performs a failover operation. Information needed to perform the failover operation is stored on the DR server thereby eliminating the need to store agents on each of the application's primary and backup servers. The DR server may provide a centralized location for the maintenance and update of the failover procedures for the internal network's redundant services. A failover operation may be initiated by an authorized user in communication with the internal computer network.

19 Claims, 3 Drawing Sheets

DISASTER RECOVERY FRAMEWORK

BACKGROUND OF THE INVENTION

1. Field of the Invention

The present invention relates to systems and methods for management of services within a network of computer systems and more specifically to services for server failover within such systems.

2. Description of the related art

An organization often requires that certain services that support the organization's mission be available throughout the day. Services may be provided through applications executing on servers connected to the organization's internal network, such as, for example, an intranet. Interruption of the service may adversely affect the operation of the organization. A redundant server system may be used to minimize any service interruption. A redundant server system includes a primary server and a backup server that are both configured to execute the application providing the service. In normal operation, the service is provided by the application executing on the primary server. If the service is interrupted, the backup server can provide the service by starting the application on the backup server. The process of switching from the primary server to the backup server is commonly referred to as a failover. The process of switching between the primary and backup server may automated by installing software agents on the primary and backup servers that execute the failover process on their respective servers.

A large organization may have tens or hundreds of services that must have high availability and require backup servers and procedures to execute the switch when required. Moreover, the organization may use a variety of servers and applications that each requires a different shutdown or startup procedure. Therefore, there remains a need for systems and methods that can manage failover operations across the organization's network from anywhere on the network.

SUMMARY OF THE INVENTION

A system and method of orchestrating failover operations of servers providing services to an internal computer network includes a DR server configured to execute a control script that performs a failover operation. Information needed to perform the failover operation is stored on the DR server thereby eliminating the need to store agents on each of the application's primary and backup servers. The DR server may provide a centralized location for the maintenance and update of the failover procedures for the internal network's redundant services. A failover operation may be initiated by an authorized user in communication with the internal computer network.

One embodiment of the present invention is directed to a system comprising: a primary server in communication with an internal computer network, the primary server executing an application providing a service to the internal computer network; a backup server in communication with the internal computer network, the backup server capable and configured to execute the application; a DR server in communication with the internal computer network; and a failover script stored on the DR server, the failover script performing a failover operation on the backup server when executed on the DR server.

Another embodiment of the present invention is directed to a method of orchestrating a failover operation from a DR server in communication with an internal computer network, a primary server and a backup server, the primary server and backup server configured to run an application that provides a service to the internal computer network, the method comprising: receiving a command through the internal computer network from a user to perform a failover operation for the application; retrieving a security ticket from the primary server based on the user; reading a configuration file stored on the DR server, the configuration file containing information for the failover operation of the application; and executing a failover operation of the application based on the information read from the configuration file.

BRIEF DESCRIPTION OF THE DRAWINGS

The invention will be described by reference to the preferred and alternative embodiments thereof in conjunction with the drawings in which.

DETAILED DESCRIPTION

An embodiment of the present invention provides for the orchestration of disaster recovery activation for services provided on an organization's internal computer network. A log of the recovery process is generated and stored for later review of the status of the recovery process. The recovery operation is preferably orchestrated by a control script that contains subroutines that execute portions of the recovery process on a target server. Target-specific information for the recovery process may be stored in a configuration file. The control script may be activated via a command-line interface or via a web front-end that is accessed through the organization's internal computer network. Embodiments of the present invention do not require modification of the applications providing the service or installation of agents on the target servers.

Figure 1:
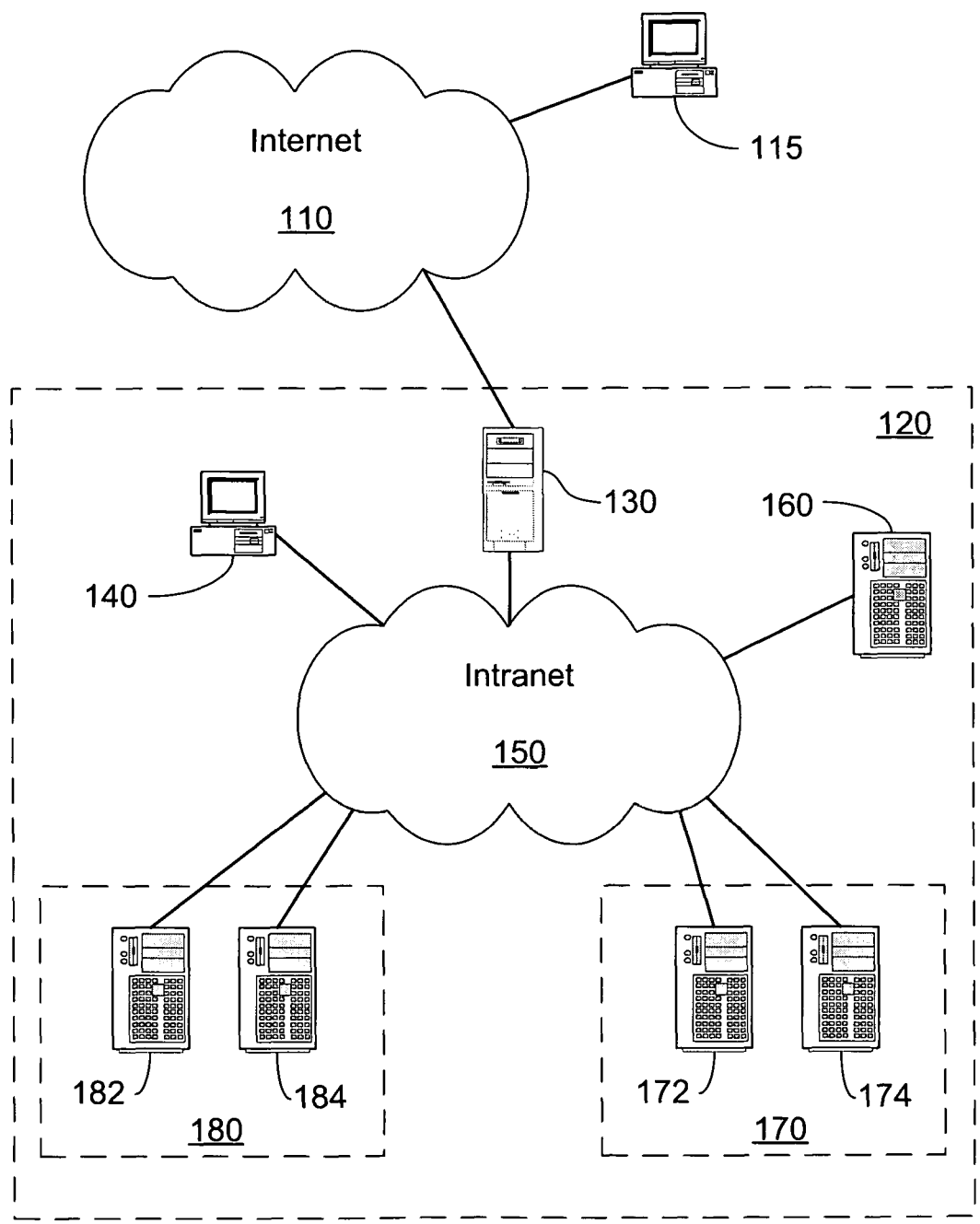
FIG. 1 is diagram illustrating a computer network used in some embodiments of the present invention.

FIG. 1 is diagram illustrating a computer network used in some embodiments of the present invention. In a preferred embodiment, an external computer 115 may access an organization's computer network 120 via an external communications network 110 such as, for example, the internet. A gateway server 130 provides a bridge between the external network 110 and the organization's internal computer network 150. In a preferred embodiment, the internal computer network 150 is an intranet. The gateway server 130 also provides security to computer network 120 by preventing unauthorized access to network 120. The structure and operation of computer networks are known and described in numerous publications such as, for example, Craig Zacker, Networking: The Complete Reference, The McGraw-Hill Companies, Berkeley, Calif. (2001), incorporated herein by reference.

Users may access the resources and services of the computer network 120 through a computer 140 that is directly connected to the intranet 150 or through external computer 115 via the internet 110. Services are provided by applications executing on one or more servers. In the illustrative example of FIG. 1, a service 170 is provided by primary servers 172 and 174. Each primary server 172 and 174 may execute a portion of an application providing the service 170. The organization may consider service 170 sufficiently important to provide backup servers 182 and 184 that are capable of providing the service if the service from primary servers is interrupted. In some embodiments, the location of backup servers 182 and 184 is in a different geographical region and is usually referred to as a failover site 180.

The process of switching servers providing a service is generally referred to as a failover process. In some embodiments of the present invention, the failover process may include three types of failover operations that each covers a possible disaster situation.

In a first situation, herein referred to as a migration, both the primary and failover sites are available and the service is switched from the primary site to the failover site. During the migration operation, the application providing the service at the primary site is first shutdown, followed by any necessary data replication before the application is started at the failover site.

In a second situation, herein referred to as a takeover, the primary site is unavailable thereby preventing an orderly shutdown of the application at the primary site or any necessary data replication to the failover site. The primary site may become unavailable for a variety of reasons such as, for example, a power loss at the primary site, interruption of a communication link between the primary site and the organization's intranet, or physical damage to the servers or data storage devices at the primary site. During the takeover operation, the application is started at the failover site.

In a third situation, herein referred to as a failback, the service is being provided by the failover site and the service is switched back to the primary site. During the migration operation, the application providing the service at the failover site is first shutdown, followed by any necessary data replication before the application is started at the primary site.

Authorization to initiate a failover is tightly controlled and is usually vested in only a few authorized managers. When one of the authorized managers determines that a failover is necessary, he or she enters the commands necessary to accomplish the failover process. In order to reduce error, the series of commands are printed in a disaster recovery manual that is accessible to the authorized manager. The failover operation may require that the authorized manager log onto several different servers to complete the failover operation. For example, in addition to logging onto the primary and backup servers, the authorized manager may also require access to a server managing the domain name service (DNS) for the organization's computer network and to a server managing a storage area network (SAN) for the organization's computer network.

In a preferred embodiment, the series of commands are stored as a script on a DR server 160. The DR server 160 preferably stores a failover script for each service that has a failover site. In some embodiments, DR server 160 may act as a central depository for recovery scripts for a region thereby providing for easier maintenance and updates of the recovery scripts.

Figure 2:
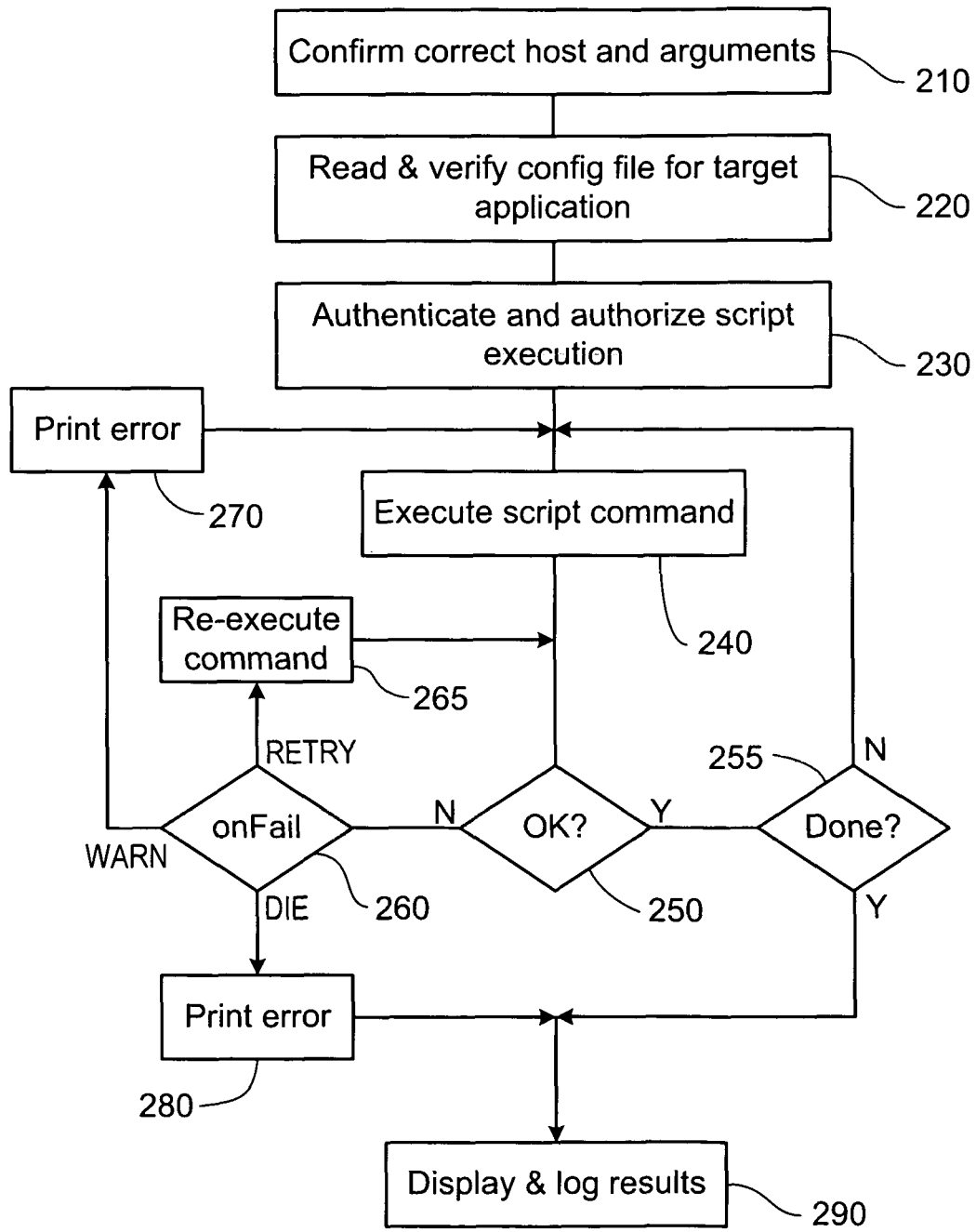
FIG. 2 is flow diagram illustrating an embodiment of the present invention.

FIG. 2 is a flowchart illustrating the failover process. In a preferred embodiment, a control script manages the failover process and calls other scripts or subroutines that execute target-specific procedures on the target server. After the control script is activated by the authorized manager, step 210 checks to confirm that the script is running as a correct user on the correct target host or server. In some embodiments, only specific user/host combinations are allowed to execute the failover procedure. If the user/host combination is invalid, the script terminates, logs the result in a log file, and displays the result to the authorized manager. If the user/host combination is valid, the script checks the validity of any arguments or options specified with the invocation of the control script. For example, an action option may be specified when the control script is initiated. The action option identifies the operation to be performed by the control script and should therefore specify a valid operation. The control script confirms that the action option specifies one of the valid operations in step 210. If the action option is invalid, the script terminates, records the results in a log file and displays the result to the authorized manager.

In step 220, a configuration file for the application is read and verified. The configuration file is verified by comparing the configuration file to a template file that reflects the rules for valid configuration data. If the configuration file contains invalid data, the script terminates, records the result in a log file, and displays the result to the authorized manager.

If the configuration file contains valid data, an authentication and authorization procedure is performed in step 230 before control script commands are executed on the target host. Authentication and authorization may follow any of the known security procedures for networks. In a preferred embodiment, authentication and authorization is accomplished using a Kerberos protocol described in RFC 1510 available from http://www.freesoft.org/CIE/RFC/1510/(September 1993), herein incorporated by reference. A Kerberos ticket for the application providing the service is stored on the DR server for each available application. Each primary and backup server stores a file containing a list of Kerberos tickets that it will accept. Each Kerberos ticket allows only the specific user/host/application combination to establish a secure channel with the target host.

Once the secure channel is established between the target host and the DR server, the DR server transmits a script command to the target host for execution on the target host in step 240. The target host returns a signal to the DR server indicating a status of the executed command, i.e., whether the script command was successfully executed or failed. The DR server checks the returned signal in step 250. If the returned signal indicates a successful execution of the command, the DR server determines if the executed command was the last command in the script in step 255. If the executed command is the last command, the DR server records the result, displays the result to the user, and terminates the script. If the executed command is not the last command, the script branches back to step 240 to execute the next script command.

If the returned signal indicates an unsuccessful execution of the command, the DR server examines an on Fail option associated with the command in step 260. If the on Fail option is set to DIE, the DR server prints an error message to the log file in step 280, displays the error message to the user, and terminates the script in step 290. If the on Fail option is set to WARN, the DR server prints an error message to the log file in step 290 and branches back to step 240 to execute the next script command. If the on Fail option is set to RETRY, the DR server re-executes the command in step 265 before branching to step 250 to determine if the re-executed command was successfully executed. The RETRY flag may be followed by a repeat number and a DIE or WARN flag. For example, if on Fail=RETRY, RETRY, DIE, the DR server will resend the command to the target host for re-execution twice and if the command is still unsuccessful after the second retry, the DR server will branch according to the DIE flag.

Figure 3:
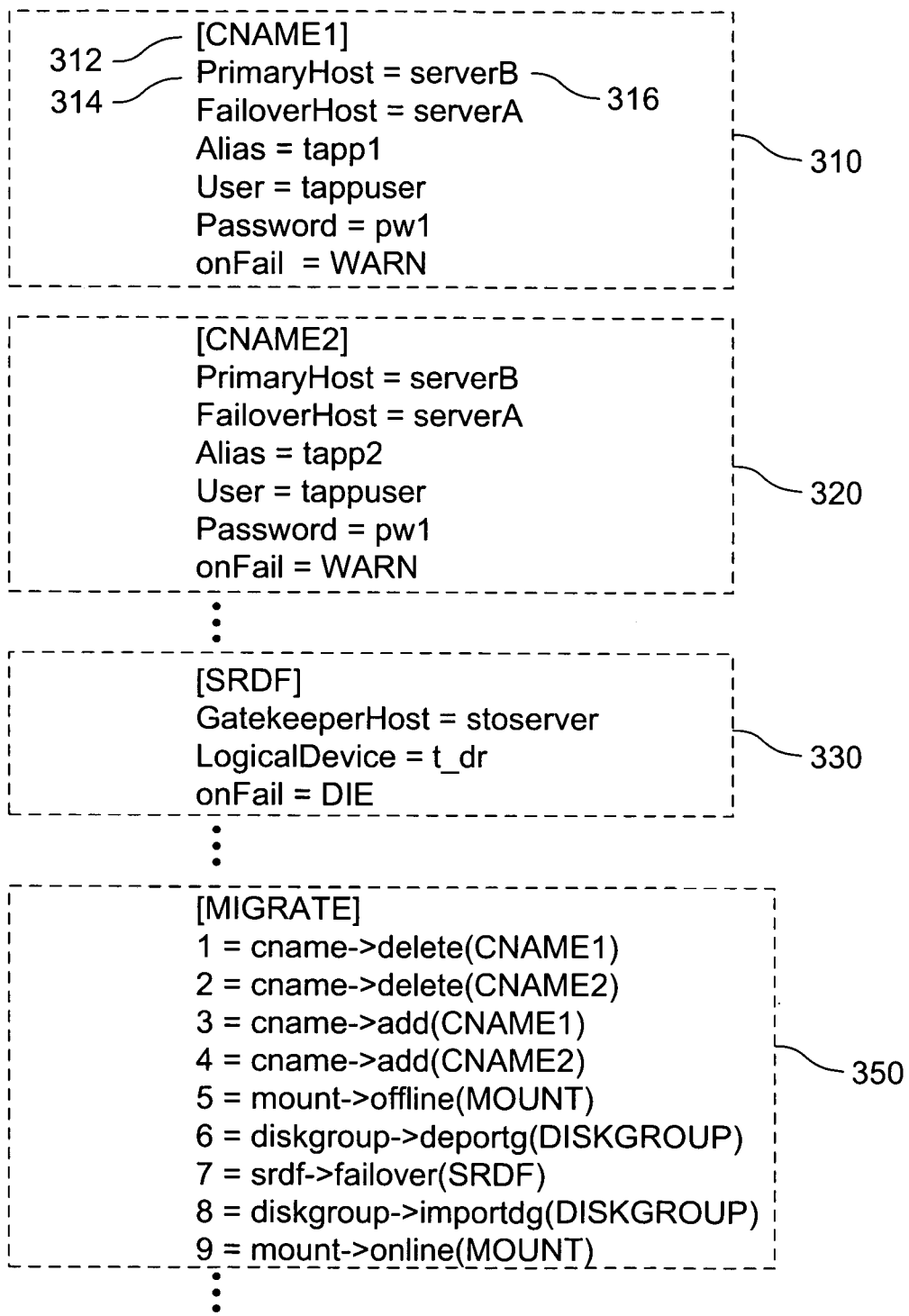
FIG. 3 is shows a portion of a configuration file used in some embodiments of the present invention.

FIG. 3 shows a portion of a configuration file that may be used in some embodiments of the present invention. In a preferred embodiment, the configuration file is a plain text file in a key-value format containing a target 312, a key 314 and a paired value 316. Each target contains an onFail key that describes an action to take if the subroutine for the target fails. In FIG. 3, a MIGRATE target 350 is shown with an integer keys that correspond to a script step that is executed when a migration operation is selected for the failover process. In the example shown in FIG. 3, assuming that the authorized manager has selected the migrate operation and after a secure channel is established, the DR server executes the first script command in the MIGRATE target, which in this example is cname→delete(CNAME1). The cname module requires five parameters that identify the primary host, the failover host, an alias, a user name, and a password. In the example shown in FIG. 3, the steps 1-4 switch the alias names between the primary server and the failover server by first deleting the alias from the primary and failover server (steps 1-2) and adding the new alias to the primary and failover server (steps 3-4). The user name and password specified in CNAME1 310 and CNAME2 320 allow the authorized manager to log onto the organization's DNS server that manages the domain names for the organization's servers. Both CNAME1 310 and CNAME2 320 specify that onFail=WARN, which is used by the control script to determine an action if the command is not successfully executed.

In step 5, the DR server sends a command to the primary server to dismount the application's file system directory and in step 6, the DR server sends a command to the primary server to deport the application's disk group. In step 7, the DR server executes the command, srdf→failover(SRDF) that switches the state of the primary and secondary storage to allow the secondary storage to be mounted for the failover host. The srdf module uses two parameters that are defined in the SRDF module 330 that identify a gatekeeper host that manages the primary and failover storage devices and defines the specific storage devices that are switched. The particular commands in the srdf module depend on the SAN manager used to control the primary and failover storage devices. In step 6, the DR server sends a command to the failover server to port application's disk group on the failover server. In step 7, the DR server sends a command to the failover server to mount the application's file system on the failover server.

Having thus described at least illustrative embodiments of the invention, various modifications and improvements will readily occur to those skilled in the art and are intended to be within the scope of the invention. Accordingly, the foregoing description is by way of example only and is not intended as limiting. The invention is limited only as defined in the following claims and the equivalents thereto.

What is claimed:

1. A system, comprising:
    a plurality of primary servers in communication with an internal computer network, the plurality of primary servers each executing one or more applications providing a service to the internal computer network;
    a plurality of backup servers in communication with the internal computer network, the plurality of backup servers each configured to execute the one or more applications;
    a DR server in communication with the plurality of primary servers and plurality of backup servers over the internal computer network; and
    a plurality of failover scripts stored on the DR server, each of the plurality of failover scripts associated with at least one of the one or more applications,
    the plurality of failover scripts programmed to perform at least one failover operation, on each of the plurality of backup servers configured to execute the at least one of the one or more applications, when executed on the DR server,
    wherein the at least one failover operation comprises a migration of the service from at least one of the plurality of primary servers to at least one of the plurality of backup servers, where the primary servers and backup servers are available, and the migration of the service comprises data replication during the migration and before the at least one of the one or more applications is started at the backup servers,
    wherein, during migration of the service from the at least one of the plurality of primary servers to the at least one of the plurality of backup servers, the DR server sends a command to the at least one of the plurality of primary servers to dismount a file system corresponding to the at least one of the plurality of primary servers and the DR server sends a command to the at least one of the plurality of backup servers to mount the file system,
    the DR server sends script commands from the plurality of failover scripts to the plurality of primary servers and backup servers, the DR server receives a return signal indicating a status of each of the script commands;
    the DR server checks an option associated with the script command in the plurality of failover scripts if the return signal indicates an unsuccessful execution of the script command, and
    the DR server selects the next script command to execute based on the attribute associated option.

2. The system of claim 1, wherein the internal computer network is an intranet.

3. The system of claim 1, wherein the at least one failover operation further comprises a takeover of the service by at least one of the plurality of backup servers.

4. The system of claim 1, wherein the at least one failover operation further comprises a failback of the service from at least one of the plurality of primary servers to at least one of the plurality of backup servers.

5. The system of claim 1, wherein at least one of the plurality of failover scripts is initiated to begin execution on the DR server from a computer in communication with the internal computer network.

6. The system of claim 1, wherein the one or more applications executed on the backup server is a copy of the one or more applications executed on the primary server.

7. The system according to claim 1, wherein the DR server executes the plurality of failover scripts after one of the services provided by one of the applications executed on one of the primary servers is interrupted.

8. A method, comprising:
    providing a DR server in communication with a plurality of primary servers and a plurality of backup servers over an internal computer network, the plurality of primary servers and the plurality of backup servers configured to execute one or more applications providing one or more services to the internal computer network;
    receiving a command through the internal computer network from a user to perform a failover operation for at least one of the one or more applications;
    retrieving a security ticket from one of the plurality of primary servers based on the user;
    storing a plurality of configurations files on the DR server, each of the configuration files containing a script command for a failover operation for at least one of the one or more applications;
    retrieving and reading one of the plurality of configuration files stored on the DR server;
    executing the failover operation, on the backup server configured to execute the at least one of the one or more applications, based on the script command read by the DR server from the one of the plurality of configuration files, wherein the failover operation comprises a migration of the one or more services from at least one of the plurality of primary servers to at least one of the plurality of backup servers, where the primary servers and backup servers are available, and the migration of the service comprises data replication during the migration and before the at least one of the one or more applications is started at the backup servers wherein, during migration of the one or more services from the at least one of the plurality of primary servers to the at least one of the plurality of backup servers, the DR server sends a command to the at least one of the plurality of primary servers to dismount a file system corresponding to the at least one of the plurality of primary servers and the DR server sends a command to the at least one of the plurality of backup servers to mount the file system;

receiving a return signal indicating a status of each of the script commands;

checking an option associated with the script command in the plurality of configuration files if the return signal indicates an unsuccessful execution of the script command, and selecting the next script command to execute based on the associated option.

9. The method of claim 8, wherein the step of executing further comprises:

logging on to a DNS server providing a domain name service to the internal computer network; and switching a DNS alias of at least one of the plurality of primary servers with a DNS alias of at least one of the plurality of backup servers.

10. The method of claim 8, wherein the step of executing further comprises:

logging on to a gatekeeper host providing storage area network management service to the internal computer network; and switching a state of a primary storage with a state of a secondary storage thereby enabling mounting of the secondary storage of at least one of the plurality of backup servers.

11. The method of claim 8, wherein the step of executing further comprises:

recording the status in a log file; and displaying the status to the user.

12. The method of claim 8, wherein the script command is re-executed if the status of the executed script command indicates failure.

13. The method of claim 8, wherein if the status of the executed script command indicates failure, a next script command from the at least one of the plurality of configuration files is executed.

14. The method of claim 8, wherein the one or more applications executed on the backup server is a copy of the one or more applications executed on the primary server.

15. The method according to claim 8, wherein the failover operation is executed by the DR server after one of the services provided by one of the applications executed on one of the primary servers is interrupted.

16. A system, comprising:

a plurality of primary servers in communication with an internal computer network, the plurality of primary servers each executing one or more applications providing a service to the internal computer network;

a plurality of backup servers in communication with the internal computer network, the plurality of backup servers each configured to execute the one or more applications;

a DR server in communication with the plurality of primary servers and plurality of backup servers over the internal computer network; and a plurality of failover scripts stored on the DR server, each of the plurality of failover scripts associated with at least one of the one or more applications, the plurality of failover scripts programmed to perform at least one failover operation, on each of the plurality of backup servers configured to execute the at least one of the one or more applications, when executed on the DR server, the DR server sends script commands from the plurality of failover scripts to the plurality of primary servers and backup servers, the DR server receives a return signal indicating a status of each of the script commands;

the DR server checks an option associated with the script command in the plurality of failover scripts if the return signal indicates an unsuccessful execution of the script command, and the DR server selects the next script command to execute based on the associated option.

17. The system according to claim 16, wherein the at least one failover operation comprises a migration of the service from at least one of the plurality of primary servers to at least one of the plurality of backup servers, where the primary servers and backup servers are available, and the migration of the service comprises data replication during the migration and before the at least one of the one or more applications is started at the backup servers wherein, during migration of the service from the at least one of the plurality of primary servers to the at least one of the plurality of backup servers, the DR server sends a command to the at least one of the plurality of primary servers to dismount a file system corresponding to the at least one of the plurality of primary servers and the DR server sends a command to the at least one of the plurality of backup servers to mount the file system.

18. A method, comprising:

providing a DR server in communication with a plurality of primary servers and a plurality of backup servers over an internal computer network, the plurality of primary servers and the plurality of backup servers configured to execute one or more applications providing one or more services to the internal computer network;

receiving a command through the internal computer network from a user to perform a failover operation for at least one of the one or more applications;

retrieving a security ticket from one of the plurality of primary servers based on the user;

storing a plurality of configurations files on the DR server, each of the configuration files containing a script command for a failover operation for at least one of the one or more applications;

retrieving and reading one of the plurality of configuration files stored on the DR server;

executing the failover operation, on the backup server configured to execute the at least one of the one or more applications, based on the script command read by the DR server from the one of the plurality of configuration files, receiving a return signal indicating a status of each of the script commands;

checking an option associated with the script command in the plurality of configuration files if the return signal indicates an unsuccessful execution of the script command, the attribute being stored in one of the configuration files, and selecting the next script command to execute based on the associated option.

19. The method according to claim 18, wherein the failover operation comprises a migration of the one or more services from at least one of the plurality of primary servers to at least one of the plurality of backup servers, where the primary servers and backup servers are available, and the migration of the service comprises data replication during the migration and before the at least one of the one or more applications is started at the backup servers, wherein, during migration of the one or more services from the at least one of the plurality of primary servers to the at least one of the plurality of backup servers, the DR server sends a command to the at least one of the plurality of primary servers to dismount a file system corresponding to the at least one of the plurality of primary servers and the DR server sends a command to the at least one of the plurality of backup servers to mount the file system.

* * * * *

UNITED STATES PATENT AND TRADEMARK OFFICE
CERTIFICATE OF CORRECTION

| | | |
|---|---|---|
| PATENT NO. | : 8,572,431 B2 | Page 1 of 1 |
| APPLICATION NO. | : 11/063492 | |
| DATED | : October 29, 2013 | |
| INVENTOR(S) | : Adler et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 819 days.

Signed and Sealed this
Seventh Day of April, 2015

Michelle K. Lee
*Director of the United States Patent and Trademark Office*